United States Patent
Hayakawa et al.

(10) Patent No.: US 11,873,462 B2
(45) Date of Patent: *Jan. 16, 2024

(54) LUBRICATING OIL COMPOSITION

(71) Applicant: MITSUI CHEMICALS, INC., Tokyo (JP)

(72) Inventors: Akio Hayakawa, Narashino (JP); Shuhei Yamamoto, Ichihara (JP); Akihiro Udagawa, Chiba (JP); Masahiro Yamashita, Chiba (JP); Yusuke Saito, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/636,823

(22) PCT Filed: Aug. 26, 2020

(86) PCT No.: PCT/JP2020/032111
§ 371 (c)(1),
(2) Date: Feb. 18, 2022

(87) PCT Pub. No.: WO2021/039818
PCT Pub. Date: Mar. 4, 2021

(65) Prior Publication Data
US 2022/0275304 A1    Sep. 1, 2022

(30) Foreign Application Priority Data
Aug. 29, 2019   (JP) .................. 2019-156697

(51) Int. Cl.
C10M 169/04    (2006.01)
C10M 101/00    (2006.01)
C10M 143/08    (2006.01)
C10N 20/02     (2006.01)

(52) U.S. Cl.
CPC ...... C10M 169/041 (2013.01); C10M 101/00 (2013.01); C10M 143/08 (2013.01); C10M 2203/003 (2013.01); C10M 2203/1006 (2013.01); C10M 2205/028 (2013.01); C10N 2020/02 (2013.01)

(58) Field of Classification Search
CPC ............ C10M 169/041; C10M 101/00; C10M 143/08; C10M 2203/003; C10M 2203/1006; C10M 2205/028; C10N 2020/02
See application file for complete search history.

(56) References Cited

U.S. PATENT DOCUMENTS

| | | |
|---|---|---|
| 2,501,731 A | 3/1950 | Mertes |
| 2,616,905 A | 11/1952 | Asseff |
| 2,616,911 A | 11/1952 | Asseff |
| 2,616,925 A | 11/1952 | Asseff |
| 2,777,874 A | 1/1957 | Asseff |
| 3,076,764 A | 2/1963 | Hansen et al. |
| 3,090,821 A | 5/1963 | Voltz |
| 3,172,892 A | 3/1965 | Le |
| 3,256,186 A | 6/1966 | Greenwalkd |
| 3,265,622 A | 8/1966 | Anderson |
| 3,318,809 A | 5/1967 | Bray |
| 3,320,162 A | 5/1967 | Axe |
| 3,365,396 A | 1/1968 | Schilcht |
| 3,381,022 A | 4/1968 | Le Suer |
| 3,384,585 A | 5/1968 | Gragson |
| 3,488,284 A | 1/1970 | Lesuer |
| 3,629,109 A | 12/1971 | Gergel et al. |
| 3,634,515 A | 1/1972 | Piasek |
| 4,076,924 A | 2/1978 | Toyota et al. |
| 4,085,276 A | 4/1978 | Toyota et al. |
| 4,143,223 A | 3/1979 | Toyota et al. |
| 4,157,435 A | 6/1979 | Toyota et al. |
| 4,232,139 A | 11/1980 | Minami et al. |
| 4,234,435 A | 11/1980 | Meinhardt et al. |
| 4,250,285 A | 2/1981 | Minami et al. |

(Continued)

FOREIGN PATENT DOCUMENTS

| | | |
|---|---|---|
| EP | 1 148 115 A1 | 10/2001 |
| EP | 1 148 115 B1 | 6/2005 |

(Continued)

OTHER PUBLICATIONS

Extended European Search Report dated Aug. 4, 2020 for corresponding European Patent Application No. 17888281.7.
International Searching Authority, "International Search Report," issued in connection with International Patent Application No. PCT/JP2017/046641, dated Mar. 6, 2018.
International Searching Authority, "Written Opinion," issued in connection with International Patent Application No. PCT/JP2017/046641, dated Mar. 6, 2018.
Notice of Allowance on U.S. Appl. No. 16/473,399 dated Jul. 9, 2021.
U.S. Office Action on U.S. Appl. No. 16/473,399 dated Jan. 1, 2021.

*Primary Examiner* — Ellen M McAvoy
(74) *Attorney, Agent, or Firm* — Foley & Lardner LLP

(57) ABSTRACT

A lubricating oil composition with a resin (A) and a base oil (B), the resin (A) is in a range of 0.01 to 50 parts by mass per 100 parts of (A) and (B), the resin (A) satisfies the following requirements: (A-1) the resin (A) is a polymer including a constituent unit from 4-methyl-1-pentene in a range of 60 to 99 mol % and a constituent unit from an α-olefin having 2 to 20 carbon atoms (excluding 4-methyl-1-pentene) in a range of 1 to 40 mol % (provided that 4-methyl-1-pentene and the α-olefin is 100 mol %); (A-2) intrinsic viscosity [η] measured in decalin at 135° C. is in a range of 0.01 to 5.0 dl/g; (A-3) a melting point (Tm) is in a range of 110 to 150° C. as determined by DSC; and the base oil (B) has (B-1) kinematic viscosity at 100° C. is in a range of 1 to 50 mm²/s.

9 Claims, No Drawings

(56) References Cited

U.S. PATENT DOCUMENTS

| | | |
|---|---|---|
| 4,285,822 A | 8/1981 | Devries et al. |
| 4,315,874 A | 2/1982 | Ushida et al. |
| 4,330,649 A | 5/1982 | Kioka et al. |
| 4,335,015 A | 6/1982 | Imai et al. |
| 4,401,589 A | 8/1983 | Kioka et al. |
| 4,490,513 A | 12/1984 | Minami et al. |
| 4,654,403 A | 3/1987 | Tipton |
| 4,742,139 A | 5/1988 | Kioka et al. |
| 4,892,851 A | 1/1990 | Ewen et al. |
| 4,952,649 A | 8/1990 | Kioka et al. |
| 5,036,034 A | 7/1991 | Ewen |
| 5,155,080 A | 10/1992 | Elder et al. |
| 5,158,920 A | 10/1992 | Razavi |
| 5,162,278 A | 11/1992 | Razavi |
| 5,223,467 A | 6/1993 | Razavi |
| 5,223,468 A | 6/1993 | Razavi |
| 5,225,500 A | 7/1993 | Elder et al. |
| 5,243,002 A | 9/1993 | Razavi |
| 5,278,265 A | 1/1994 | Razavi |
| 5,292,838 A | 3/1994 | Razavi |
| 5,304,523 A | 4/1994 | Razavi |
| 5,334,677 A | 8/1994 | Razavi et al. |
| 5,561,092 A | 10/1996 | Ewen et al. |
| 5,583,188 A | 12/1996 | Kashiwa et al. |
| 5,589,556 A | 12/1996 | Razavi |
| 5,763,549 A | 6/1998 | Elder et al. |
| 5,807,939 A | 9/1998 | Elder et al. |
| 5,883,202 A | 3/1999 | Ewen et al. |
| 6,200,936 B1 | 3/2001 | Moreton |
| 6,310,009 B1 | 10/2001 | Kocsis et al. |
| 6,369,175 B1 | 4/2002 | Ewen |
| 6,399,549 B1 | 6/2002 | Taylor et al. |
| 6,417,120 B1 | 7/2002 | Mitchler et al. |
| 6,525,007 B2 | 2/2003 | Okada et al. |
| 6,559,105 B2 | 5/2003 | Abraham et al. |
| 6,589,920 B2 | 7/2003 | Okada et al. |
| 6,939,928 B1 | 9/2005 | Kawai et al. |
| 7,589,145 B2 | 9/2009 | Brant et al. |
| 7,803,888 B2 * | 9/2010 | Kawahara ............... D01F 6/04 526/170 |
| 8,921,291 B2 | 12/2014 | Wu et al. |
| 10,040,884 B2 | 8/2018 | Harada et al. |
| 11,162,050 B2 * | 11/2021 | Hayakawa ........... C10M 143/08 |
| 2002/0035044 A1 | 3/2002 | Okada et al. |
| 2002/0055445 A1 | 5/2002 | Okada et al. |
| 2002/0107153 A1 | 8/2002 | Taylor et al. |
| 2002/0155776 A1 | 10/2002 | Mitchler et al. |
| 2003/0055179 A1 | 3/2003 | Ota et al. |
| 2005/0228155 A1 | 10/2005 | Kawai et al. |
| 2006/0199896 A1 | 9/2006 | Walton et al. |
| 2007/0249508 A1 | 10/2007 | Matsuda et al. |
| 2008/0125561 A1 | 5/2008 | Matsuda et al. |
| 2009/0023619 A1 | 1/2009 | Kaneshige et al. |
| 2012/0190601 A1 | 7/2012 | Ikeda et al. |
| 2013/0052464 A1 | 2/2013 | Kawabe et al. |
| 2015/0239996 A1 | 8/2015 | Funaya et al. |
| 2016/0376385 A1 | 12/2016 | Funaya et al. |
| 2017/0327610 A1 | 11/2017 | Funaya et al. |
| 2017/0327611 A1 | 11/2017 | Funaya et al. |
| 2019/0048109 A1 * | 2/2019 | Tanaka ................. B29C 48/00 |
| 2020/0140776 A1 * | 5/2020 | Hayakawa ......... C10M 169/041 |
| 2021/0032397 A1 * | 2/2021 | Tanaka ................... C08L 23/20 |
| 2021/0139622 A1 * | 5/2021 | Tanaka ................... C08F 10/14 |
| 2022/0041847 A1 * | 2/2022 | Hashimoto ............... C08J 5/18 |
| 2022/0235157 A1 * | 7/2022 | Tanaka ................. C08F 210/14 |

FOREIGN PATENT DOCUMENTS

| | | |
|---|---|---|
| EP | 2 311 914 A1 | 4/2011 |
| EP | 1 178 102 B1 | 8/2017 |
| EP | 1 178 102 A1 | 2/2022 |
| GB | 1 057 716 A | 2/1967 |
| GB | 1 124 016 A | 8/1968 |
| JP | S50-108385 A | 8/1975 |
| JP | S50-126590 A | 10/1975 |
| JP | S51-020297 A | 2/1976 |
| JP | S51-028189 A | 3/1976 |
| JP | S51-064586 A | 6/1976 |
| JP | S51-092885 A | 8/1976 |
| JP | S51-136625 A | 11/1976 |
| JP | S52-087489 A | 7/1977 |
| JP | S52-100596 A | 8/1977 |
| JP | S52-104593 A | 9/1977 |
| JP | S52-147688 A | 12/1977 |
| JP | S53-002580 A | 1/1978 |
| JP | S53-040093 A | 4/1978 |
| JP | S53-043094 A | 4/1978 |
| JP | S55-135102 A | 10/1980 |
| JP | S55-135103 A | 10/1980 |
| JP | S56-000811 A | 1/1981 |
| JP | S56-011908 A | 2/1981 |
| JP | S56-018606 A | 2/1981 |
| JP | S58-083006 A | 5/1983 |
| JP | S58-138705 A | 8/1983 |
| JP | S58-138706 A | 8/1983 |
| JP | S58-138707 A | 8/1983 |
| JP | S58-138708 A | 8/1983 |
| JP | S58-138709 A | 8/1983 |
| JP | S58-138710 A | 8/1983 |
| JP | S58-138715 A | 8/1983 |
| JP | S63-057615 A | 3/1988 |
| JP | H02-041303 A | 2/1990 |
| JP | H03-193796 A | 8/1991 |
| JP | H07-025844 B2 | 3/1995 |
| JP | 2003-105365 A | 4/2003 |
| JP | 5798113 B2 | 10/2015 |
| WO | WO-00/34420 A1 | 6/2000 |
| WO | WO-00/60032 A1 | 10/2000 |
| WO | WO-01/27124 A1 | 4/2001 |
| WO | WO-01/53369 A1 | 7/2001 |
| WO | WO-01/56968 A1 | 8/2001 |
| WO | WO-2006/109631 A1 | 10/2006 |
| WO | WO-2008/047878 A1 | 4/2008 |
| WO | WO-2014/050817 A1 | 4/2014 |

* cited by examiner

LUBRICATING OIL COMPOSITION

CROSS-REFERENCE TO RELATED APPLICATIONS

The present application claims priority under 37 U.S.C. § 371 to International Patent Application No. PCT/JP2020/032111, filed Aug. 26, 2020, which claims priority to and the benefit of Japanese Patent Application No. 2019-156697, filed on Aug. 29, 2019. The contents of these applications are hereby incorporated by reference in their entireties.

TECHNICAL FIELD

The present invention relates to a lubricating oil composition satisfying particular requirements.

BACKGROUND ART

Petroleum products have the so-called temperature dependence of viscosity, that is, viscosity changes largely when temperature changes. For example, such as lubricating oil compositions used for such as automobiles preferably have small temperature dependence of viscosity. Accordingly, for the purpose of decreasing the temperature dependence of viscosity, a certain type of polymer soluble in a lubricating oil base is used in a lubricating oil as a viscosity adjusting agent.

As such viscosity adjusting agents for lubricating oils, ethylene-α-olefin copolymers are widely used, and in order to further improve the performance balance of lubricating oils, various improvements are made (see, for example, Patent Literature 1).

In recent years, because of the reduction of petroleum resources, and environmental problems such as global warming, the enhancement of the fuel consumption of automobiles intended for the reduction of the amounts of exhaust gas contaminants and $CO_2$ discharged has been required. Fuel saving with a lubricating oil is excellent in cost effectiveness compared with the physical improvement of a lubricating machine and therefore expected as an important fuel saving technique, and the demand is increasing for fuel consumption enhancement with a lubricating oil.

Power loss in engines and transmissions is divided into friction loss in sliding portions and stirring loss due to the viscosity of lubricating oils. Particularly, an example of one measure for fuel saving with an engine oil include the reduction of viscosity resistance. As also seen from the fact that in recent years, not only conventional measurement under high temperature conditions but also measurement under relatively low temperature conditions has been added to fuel consumption tests, reducing viscosity resistance at low temperature is effective for fuel consumption improvement.

For the reduction of the viscosity resistance of an engine oil, viscosity lowering is effective. Particularly at low temperature, viscosity lowering is effective in the reduction of both friction loss and stirring loss.

For the reduction of low-temperature viscosity, the use of the polymer described in Patent Literature 1 is known. The polymer is such that it dissolves in a base oil at high temperature to obtain good thickening properties, and on the other hand, the solubility in the base oil is reduced at low temperature to reduce the influence on effective volume (flow rate) and viscosity.

The viscosity adjusting agent described in Patent Literature 1 provides the reduction of the low-temperature viscosity of a lubricating oil composition including the adjusting agent and makes a certain contribution to the enhancement of fuel consumption under a condition in which the engine internal temperature is low (for example, during engine starting). However, as the demand for fuel saving increases, further reduction of low-temperature viscosity is required.

Methods for improving the low-temperature characteristics of a lubricating oil composition in good balance include a method using an ethylene-propylene copolymer having a high ethylene content as a viscosity adjusting agent (see, for example, Patent Literature 2). When the ethylene content is increased, the low-temperature characteristics are enhanced, but the ethylene chain portion of the viscosity adjusting agent crystallizes at low temperature, and the storage stability of the lubricating oil composition in a low temperature environment may decrease.

CITATION LIST

Patent Literature

Patent Literature 1: International Publication No. WO 2000/060032
Patent Literature 2: International Publication No. WO 2000/034420

SUMMARY OF INVENTION

Technical Problem

The present invention aims to provide a lubricating oil composition having a higher viscosity index (lower temperature dependence of viscosity) and excellent in low-temperature viscosity characteristics.

Solution to Problem

The present inventors have studied diligently and, as a result, found that when a viscosity adjusting agent for lubricating oils satisfying particular requirements is used in an additive composition for lubricating oils, the above problems can be solved. Specifically, the present invention relates to the following [1] to [8].

[1] A lubricating oil composition including a resin (A) and a base oil (B), wherein the resin (A) satisfies the following requirements (A-1) to (A-3), the base oil (B) satisfies the following requirement (B-1), and a content ratio between the resin (A) and the base oil (B) is such that the resin (A) is in a range of 0.01 to 50 parts by mass per 100 parts by mass in total of the resin (A) and the base oil (B):

(A-1) the resin (A) is a polymer including a constituent unit derived from 4-methyl-1-pentene in a range of 60 to 99 mol % and a constituent unit derived from an α-olefin having 2 to 20 carbon atoms (excluding 4-methyl-1-pentene) in a range of 1 to 40 mol % (provided that 4-methyl-1-pentene and the α-olefin is 100 mol % in total);

(A-2) intrinsic viscosity [η] measured in decalin at 135° C. is in a range of 0.01 to 5.0 dl/g;

(A-3) a melting point (Tm) is in a range of 110 to 150° C. as determined by differential scanning calorimetry (DSC); and (B-1) kinematic viscosity at 100° C. is in a range of 1 to 50 mm²/s.

[2] The lubricating oil composition according to item [1], wherein in the requirement (A-1), the polymer includes ethylene and/or propylene as the α-olefin.

[3] The lubricating oil composition according to item [1], wherein in the requirement (A-1), the polymer includes 1 to 18 mol % of ethylene as the α-olefin.

[4] The lubricating oil composition according to item [1], wherein in the requirement (A-1), the polymer includes 1 to 22 mol % of propylene as the α-olefin.

[5] The lubricating oil composition according to any one of items [1] to [4], wherein in the requirement (A-2), the intrinsic viscosity [η] measured in decalin at 135° C. is in a range of 0.3 to 2.5 dl/g.

[6] The lubricating oil composition according to any one of items [1] to [5], wherein the content ratio between the resin (A) and the base oil (B) is such that the resin (A) is 0.01 to 5 parts by mass per 100 parts by mass in total of the resin (A) and the base oil (B).

[7] The lubricating oil composition according to any one of items [1] to [6], wherein the base oil (B) is a mineral oil.

[8] The lubricating oil composition according to any one of items [1] to [6], wherein the base oil (B) is a synthetic oil.

[9] The lubricating oil composition according to any one of [1] to [8], including a pour-point depressant (C) in an amount of 0.05 to 5% by mass based on 100% by mass of the lubricating oil composition.

Advantageous Effect of Invention

The lubricating oil composition of the present invention can provide a lubricating oil composition having a higher viscosity index (lower temperature dependence of viscosity) and excellent in low-temperature viscosity characteristics.

DESCRIPTION OF EMBODIMENTS

The present invention will be specifically described below. In the following description, "to" indicating a numerical value range represents "or more to or less" unless otherwise noted.

<Lubricating Oil Composition>

The lubricating oil composition of the present invention includes a resin (A) and a base oil (B). The constituents will be described in detail below.

<Resin (A)>

The resin (A) that is one of the components constituting the lubricating oil composition satisfies the following requirements (A-1) to (A-3).

[Requirement (A-1)]

The resin (A) is a polymer including a constituent unit derived from 4-methyl-1-pentene in the range of 60 to 99 mol % and a constituent unit derived from an α-olefin having 2 to 20 carbon atoms (excluding 4-methyl-1-pentene) in the range of 1 to 40 mol % (provided that 4-methyl-1-pentene and the α-olefin is 100 mol % in total).

Examples of the α-olefin having 2 to 20 carbon atoms include linear α-olefins having 2 to 20 carbon atoms, preferably 2 to 15 carbon atoms, and more preferably 2 to 10 carbon atoms, such as ethylene, propylene, 1-butene, 1-pentene, 1-hexene, 1-octene, 1-decene, 1-undecene, 1-dodecene, 1-tetradecene, 1-hexadecene, 1-octadecene, and 1-eicosene, and branched α-olefins having 5 to 20 carbon atoms, preferably 5 to 15 carbon atoms, such as 3-methyl-1-butene, 3-methyl-1-pentene, 3-ethyl-1-pentene, 4,4-dimethyl-1-pentene, 4-methyl-1-hexene, 4,4-dimethyl-1-hexene, 4-ethyl-1-hexene, and 3-ethyl-1-hexene. Among these, ethylene, propylene, 1-butene, 1-pentene, 1-hexene, and 1-octene are preferred, ethylene and propylene are more preferred, and ethylene is particularly preferred.

The resin (A) according to the present invention preferably includes the constituent unit derived from 4-methyl-1-pentene in the range of 65 to 99 mol %. The resin (A) according to the present invention further preferably includes the constituent unit derived from 4-methyl-1-pentene in the range of 70 to 99 mol % based on all constituent units constituting the resin (A).

The resin (A) according to the present invention more preferably includes a constituent unit derived from ethylene in the range of 1 to 18 mol % (provided that 4-methyl-1-pentene and ethylene is 100 mol % in total).

The resin (A) according to the present invention further preferably includes the constituent unit derived from ethylene in the range of 11 to 16 mol % (provided that 4-methyl-1-pentene and ethylene is 100 mol in total %).

The resin (A) according to the present invention more preferably includes a constituent unit derived from propylene in the range of 1 to 22 mol % (provided that 4-methyl-1-pentene and propylene is 100 mol % in total).

The resin (A) according to the present invention further preferably includes the constituent unit derived from propylene in the range of 15 to 19 mol % (provided that 4-methyl-1-pentene and propylene is 100 mol % in total).

It is preferred that the resin (A) according to the present invention include the constituent unit derived from 4-methyl-1-pentene, and the constituent unit derived from propylene or ethylene, or the constituent unit derived from propylene in the ranges because the melting point (Tm) in the requirement (A-3) described later is easily adjusted in the desired range.

[Requirement (A-2)]

The resin (A) according to the present invention has an intrinsic viscosity [η] in the range of 0.01 to 5.0 dl/g as measured in decalin at 135° C. The resin (A) according to the present invention preferably has an intrinsic viscosity [η] in the range of 0.1 to 4.0 dl/g, more preferably 0.3 to 2.5 dl/g, as measured in decalin at 135° C. The resin (A) according to the present invention further preferably has an intrinsic viscosity [η] in the range of 0.5 to 2.0 dl/g as measured in decalin at 135° C.

The intrinsic viscosity [η] can be set within the above range by controlling, for example, the polymerization temperature and the molecular weight adjusting agent such as hydrogen during the polymerization of the resin (A). As the intrinsic viscosity [η] becomes higher, the viscosity of the resin (A) and the obtained viscosity adjusting agent for lubricating oils becomes higher. When the lubricating oil composition is obtained, the amount of the viscosity adjusting agent for lubricating oils blended is usually appropriately adjusted for adjustment to necessary physical properties as the lubricating oil composition, for example, a specific kinematic viscosity at 100° C. It is preferred that the intrinsic viscosity [η] of the resin (A) be in the above range because the amount of the obtained viscosity adjusting agent for lubricating oils blended can be in an appropriate ratio to the base oil. In addition, it is preferred that the intrinsic viscosity [η] of the resin (A) be in the above range because the shear stability is in a suitable range.

[Requirement (A-3)]

The resin (A) according to the present invention has a melting point (Tm) in the range of 110 to 150° C., preferably in the range of 115 to 145° C., as determined by differential scanning calorimetry (DSC). The resin (A) according to the present invention further preferably has a melting point (Tm) in the range of 120 to 140° C.

It is preferred that the resin (A) according to the present invention have a melting point (Tm) in the above range because it has a high viscosity index and low low-temperature viscosity.

In addition, when the resin (A) according to the present invention has a melting point (Tm) in the above range, resin pellets are difficult to block and handled well, and the resin (A) dissolves easily in the base oil (B) so that a uniform lubricating oil composition can be obtained, because the resin (A) includes a moderate amount of constituent unit derived from 4-methyl-1-pentene.

On the other hand, a resin having a melting point (Tm) of less than 110° C. has low releasability, and therefore resin pellets are easily blocked and difficult to handle. On the other hand, a resin having a melting point (Tm) of more than 150° C. has high crystallinity and therefore is difficult to dissolve in the base oil (B), and a concentrate becomes cloudy and gels, and is difficult to handle.

<Method for Producing Resin (A)>

The method for producing the resin (A) according to the present invention is not particularly limited as long as one satisfying the predetermined requirements can be obtained. When the resin (A) is a 4-methyl-1-pentene-α-olefin copolymer (wherein α-olefin refers to ethylene and an α-olefin having 20 or less carbon atoms), the resin (A) can be obtained by polymerizing 4-methyl-1-pentene and the α-olefin in the presence of an appropriate polymerization catalyst.

The copolymer can be produced, for example, by copolymerizing at least 4-methyl-1-pentene and an α-olefin having 2 to 20 carbon atoms using a catalyst including a compound containing a transition metal such as vanadium, zirconium, titanium, or hafnium, and at least one selected from an organoaluminum compound, an organoaluminum oxy compound, and an ionized ionic compound. Examples of the catalyst for olefin polymerization used at this time include, for example, the catalysts described in International Publication No. WO 00/34420. The content of the constituent units and melting point of the obtained copolymer can be controlled by changing the amounts of the monomers supplied. The intrinsic viscosity [η] can be controlled by changing the amount of hydrogen supplied.

<Base Oil (B)>

The base oil (B) according to the present invention satisfies the following requirement (B-1).

[Requirement (B-1)]

The kinematic viscosity at 100° C. is in the range of 1 to 50 mm²/s.

Examples of the base oil (B) according to the present invention include mineral oils; and synthetic oils such as poly-α-olefins, diesters, and polyalkylene glycols.

As the base oil (B) according to the present invention, a mineral oil or a blend of a mineral oil and a synthetic oil may be used. Examples of the diesters include, for example, polyol esters, dioctyl phthalate, and dioctyl sebacate.

Mineral oils are generally used through a refining step such as wax removal and have several grades by the way of refining. Generally, mineral oils including 0.5 to 10% of wax components are used. For example, highly refined oils having a low pour point and a high viscosity index and having a composition mainly including an isoparaffin that are produced by a hydrocracking refining method can also be used. Mineral oils having a kinematic viscosity of 10 to 200 mm²/s at 40° C. are generally used.

Mineral oils are generally used through a refining step such as wax removal and have several grades by the way of refining as described above, and the grades are provided in the API (American Petroleum Institute) classification. The characteristics of lubricating oil bases classified into groups are shown in Table 1.

TABLE 1

| Group | Type | Viscosity index *1 | Saturated hydrocarbon components (vol %) *2 | Sulfur components (wt %) *3 |
|---|---|---|---|---|
| (i) | Mineral oils | 80-120 | <90 | >0.03 |
| (ii) | Mineral oils | 80-120 | ≥90 | ≤0.03 |
| (iii) | Mineral oils | ≥120 | ≥90 | ≤0.03 |
| (iv) | Poly-α-olefins | | | |
| (v) | Lubricating oil bases other than above | | | |

*1: measured in accordance with ASTM D445 (JIS K2283)
*2: measured in accordance with ASTM D3238
*3: measured in accordance with ASTM D4294 (JIS K2541)

The poly-α-olefins in Table 1 are hydrocarbon-based polymers obtained by polymerizing at least an α-olefin having 10 or more carbon atoms as one raw material monomer, and, for example, polydecene obtained by polymerizing 1-decene is illustrated.

As the base oil (B), the mineral oils belonging to the group (ii) or the group (iii), or the poly-α-olefins belonging to the group (iv) are preferred. The group (ii) and the group (iii) tend to have a lower wax concentration than the group (i). Among the mineral oils belonging to the group (ii) or the group (iii), those having a kinematic viscosity of 1 to 50 mm²/s at 100° C. are preferred.

<Content Ratio Between Resin (A) and Base Oil (B)>

In the lubricating oil composition of the present invention, the content ratio between the resin (A) and the base oil (B) is such that the resin (A) is in the range of 0.01 to 50 parts by mass per 100 parts by mass in total of the resin (A) and the base oil (B).

When the lubricating oil composition of the present invention is used, for example, for engine applications, the lubricating oil composition preferably includes 0.1 to 5 parts by mass of the resin (A) and 95 to 99.9 parts by mass of the base oil (B) [provided that the resin (A) and the base oil (B) is 100 parts by mass in total]. The resin (A) is preferably contained in the proportion of 0.2 to 4 parts by mass, more preferably 0.3 to 3 parts by mass, and further preferably 0.5 to 2 parts by mass, and the base oil (B) is preferably contained in the proportion of 96 to 99.8 parts by mass, more preferably 97 to 99.7 parts by mass, and further preferably 98 to 99.5 parts by mass. One resin (A) may be used alone, or a plurality of resins (A) may be used in combination.

On the other hand, when the lubricating oil composition of the present invention is used as a lubricating oil additive composition (so-called concentrate), the lubricating oil composition preferably includes the resin (A) and the base oil (B) in the ratio of 1 to 50 parts by mass to 50 to 99 parts by mass [provided that the resin (A) and the base oil (B) is 100 parts by mass in total]. The lubricating oil composition more preferably includes the resin (A) in the range of 2 to 40 parts by mass and the base oil (B) in the range of 60 to 98 parts by mass, more preferably the resin (A) in the range of 3 to 30 parts by mass and the base oil (B) in the range of 70 to 97 parts by mass.

When the lubricating oil composition of the present invention is used as a lubricating oil additive composition (so-called concentrate), usually, the lubricating oil composition generally includes no pour-point depressant (C) and other components (additives) described later or contains an antioxidant described later in the range of 0.01 to 1% by mass, preferably 0.05 to 0.5% by mass, as needed. The lubricating oil additive composition can be used for various applications as a lubricating oil composition by blending the base oil (B) and the pour-point depressant (C) and other components (additives) described later.

<Pour-Point Depressant (C)>

The lubricating oil composition of the present invention may further contain the pour-point depressant (C). The content of the pour-point depressant (C) is not particularly limited as long as the effect of the present invention is achieved. The pour-point depressant (C) is usually contained in an amount of 0.05 to 5% by mass, preferably 0.05 to 3% by mass, more preferably 0.05 to 2% by mass, and further preferably 0.05 to 1% by mass based on 100% by mass of the lubricating oil composition.

Examples of the pour-point depressant (C) that the lubricating oil composition of the present invention may contain include, for example, alkylated naphthalenes, (co)polymers of alkyl methacrylates, (co)polymers of alkyl acrylates, copolymers of alkyl fumarates and vinyl acetate, α-olefin polymers, and copolymers of α-olefins and styrene. Particularly, (co)polymers of alkyl methacrylates and (co)polymers of alkyl acrylates may be used.

<Other Components (Additives)>

The lubricating oil composition of the present invention may include other components (additives) other than the resin (A) and base oil (B). Examples of other components optionally include any one or more materials described later.

The content when the lubricating oil composition of the present invention contains additives is not particularly limited, and the content of the additives is usually more than 0% by mass, preferably 1% by mass or more, more preferably 3% by mass or more, and further preferably 5% by mass or more per 100% by mass in total of the base oil (B) and the additives. The content of the additives is usually 40% by mass or less, preferably 30% by mass or less, more preferably 20% by mass or less, and further preferably 15% by mass or less.

One of such additives is a detergent. Many conventional detergents used in the field of engine lubrication provide basicity or TBN to lubricating oils by the presence of basic metal compounds (typically metal hydroxides, metal oxides, and metal carbonates based on metals such as calcium, magnesium, and sodium). Such metallic perbasic detergents (also referred to as perbasic salts or ultrabasic salts) are usually single phase homogeneous Newtonian systems characterized by a metal content exceeding an amount that seems to be present for neutralization according to the stoichiometry of a metal and a particular acidic organic compound that reacts with the metal. A perbasic material is typically prepared by reacting an acidic material (typically an inorganic acid such as carbon dioxide or a lower carboxylic acid) with a mixture of an acidic organic compound (also referred to as substrate) and a metal salt in a stoichiometrically excess amount, typically in an organic solvent (for example, a mineral oil, naphtha, toluene, or xylene) inert to the acidic organic substrate. A small amount of an accelerating agent such as a phenol or an alcohol is optionally present. The acidic organic substrate will usually have a sufficient number of carbon atoms in order to provide a certain degree of solubility in oils.

Such conventional perbasic materials and methods for preparing these are well-known to those skilled in the art. Examples of patents describing techniques for making basic metal salts of sulfonic acids, carboxylic acids, phenols, phosphoric acids, and mixtures of two or more thereof include U.S. Pat. Nos. 2,501,731; 2,616,905; 2,616,911; 2,616,925; 2,777,874; 3,256,186; 3,384,585; 3,365,396; 3,320,162; 3,318,809; 3,488,284; and 3,629,109. Salixarate detergents are described in U.S. Pat. No. 6,200,936 and International Publication No. WO 01/56968. A saligenin detergent is described in U.S. Pat. No. 6,310,009.

The amount of a typical detergent in the lubricating oil composition is not particularly limited as long as the effect of the present invention is achieved. The amount of the typical detergent is usually 1 to 10% by mass, preferably 1.5 to 9.0% by mass, and more preferably 2.0 to 8.0% by mass. The amounts are all based on an oil-free state (that is, a state free from a diluent oil conventionally supplied to them).

Another additive is a dispersing agent. Dispersing agents are well-known in the field of lubricating oils, and examples of the dispersing agents mainly include those known as ashless dispersing agents and polymer dispersing agents. The ashless dispersing agents are characterized by a polar group attached to a hydrocarbon chain having a relatively large molecular weight. Examples of typical ashless dispersing agents include nitrogen-containing dispersing agents such as N-substituted long-chain alkenylsuccinimides, also known as succinimide dispersing agents. Succinimide dispersing agents are more sufficiently described in U.S. Pat. Nos. 4,234,435 and 3,172,892. Another class of ashless dispersing agents is high molecular weight esters prepared by the reaction of polyhydric aliphatic alcohols such as glycerol, pentaerythritol, and sorbitol with a hydrocarbyl acylating agent. Such materials are described in more detail in U.S. Pat. No. 3,381,022. Another class of ashless dispersing agents is Mannich bases. These are materials formed by the condensation of a high molecular weight alkyl-substituted phenol, an alkylenepolyamine, and an aldehyde such as formaldehyde and are described in more detail in U.S. Pat. No. 3,634,515. Examples of other dispersing agents include polyvalent dispersible additives, which are generally polymers based on hydrocarbons having polar functionality that provides dispersion characteristics to the above polymer.

The dispersing agent may be subjected to post-treatment by reacting it with any of various substances. Examples of these include urea, thiourea, dimercaptothiadiazole, carbon disulfide, aldehydes, ketones, carboxylic acids, hydrocarbon-substituted succinic anhydrides, nitriles, epoxides, boron compounds, and phosphorus compounds. References describing such treatment in detail are listed in U.S. Pat. No. 4,654,403. The amount of the dispersing agent in the composition of the present invention is not particularly limited as long as the effect of the present invention is achieved. The amount of the dispersing agent can be typically 1 to 10% by mass, preferably 1.5 to 9.0% by mass, and more preferably 2.0 to 8.0% by mass (all are based on an oil-free state).

Another component is an antioxidant. Antioxidants encompass phenolic antioxidants, and these may include butyl-substituted phenols having two to three t-butyl groups. The para position may be occupied by a hydrocarbyl group or a group bonding two aromatic rings. The latter antioxidant is described in more detail in U.S. Pat. No. 6,559,105. The antioxidants also include aromatic amines such as nonylated diphenylamine. Examples of other antioxidants include sulfurized olefins, titanium compounds, and molybdenum compounds. For example, U.S. Pat. No. 4,285,822 discloses a lubricating oil composition including a composition including molybdenum and sulfur. A typical amount of the antioxidant will of course depend on the specific antioxidant and its individual effectiveness, but an exemplary total amount can be 0.01 to 5% by mass, preferably 0.15 to 4.5% by mass, and more preferably 0.2 to 4% by mass. Further, one or more antioxidants may be present, and with a particular combination of these, the combined overall effect of these can be synergistic.

A thickening agent (also sometimes referred to as a viscosity index improving agent or a viscosity adjusting agent) may be included in the lubricating oil additive composition. The thickening agent is usually a polymer, and examples thereof include, for example, polyisobutenes, polymethacrylates, diene polymers, polyalkylstyrenes, esterified styrene-maleic anhydride copolymers, alkenylarene conjugated diene copolymers, and polyolefins, hydrogenated SBR (styrene butadiene rubber), and SEBS (styrene ethylene butylene styrene block copolymer). A multifunctional thickening agent also having dispersibility and/or antioxidant properties is known and may be optionally used.

Another additive is an antiwear agent. Examples of the antiwear agent include phosphorus-containing antiwear agents/extreme pressure agents such as metal thiophosphates, phosphate esters and salts thereof, and phosphorus-containing carboxylic acids, esters, ethers, and amides; and phosphites. In a particular aspect, a phosphorus antiwear agent may usually be present in an amount that provides 0.01 to 0.2% by mass, preferably 0.015 to 0.15% by mass, more preferably 0.02 to 0.1% by mass, and further preferably 0.025 to 0.08% by mass of phosphorus, which is not particularly limited as long as the effect of the present invention is achieved.

In many cases, the antiwear agent is a zinc dialkyldithiophosphate (ZDP). A typical ZDP may include 11% by mass of P (calculated based on an oil-free state), and examples of a preferred amount may include 0.09 to 0.82% by mass. Examples of antiwear agents including no phosphorus include borate esters (including boric acid epoxides), dithiocarbamate compounds, molybdenum-containing compounds, and sulfurized olefins.

Examples of other additives that may be optionally used in the lubricating oil composition include, in addition to the extreme pressure agent and antiwear agent, a friction adjusting agent, a color stabilizer, a rust preventive, a metal deactivator, and an antifoaming agent, and each may be used in a conventionally known amount.

<Method for Producing Lubricating Oil Composition>

The lubricating oil composition of the present invention can be prepared by mixing the resin (A) and the base oil (B), optionally with other desired components, by a conventionally known method. The resin (A) is easy to handle and therefore may be optionally supplied as a concentrate in the base oil (B).

<Applications of Lubricating Oil Composition>

Any of diverse known mechanical apparatuses can be lubricated with the lubricating oil composition of the present invention, for example, as automobile engine oils, lubricating oils for diesel engines for heavy vehicles, lubricating oils for marine diesel engines, lubricating oils for two-stroke engines, lubricating oils for automatic transmissions and manual transmissions, gear lubricating oils, and greases.

EXAMPLES

The present invention will be more specifically described below based on Examples, but the present invention is not limited to these Examples.

In the following Production Examples, Examples, and Comparative Example, the physical properties were measured or evaluated by the following methods. The evaluation results of copolymers are shown in Table 2-1, Table 2-2, and Table 3, and the evaluation results of lubricating oil compositions are shown in Table 4-1 and Table 4-2. In Table 2-1 to Table 4-2, "-" means non-detected.

[Physical Properties of Copolymers]

<Content of Constituent Units>

The constituent units (mol %) derived from ethylene and the α-olefin in the copolymer produced or used in the Examples or the Comparative Example are obtained by the analysis of the $^{13}$C-NMR spectrum.

In Table 2-1 and Table 2-2, 4 MP-1 means a constituent unit derived from 4-methyl-1-pentene.

(Measuring Apparatus)

AVANCE III 500 CryoProbe Prodigy type nuclear magnetic resonance apparatus manufactured by Bruker BioSpin (Measurement Conditions)

Measured nucleus: $^{13}$C (125 MHz), measurement mode: single-pulse proton broadband decoupling, pulse width: 45° (5.00 μs), number of points: 64 k, measurement range: 250 ppm (−55 to 195 ppm), repetition time: 5.5 s, number of accumulations: 512 times, measurement solvent: orthodichlorobenzene/benzene-$d_6$ (4/1 v/v), sample concentration: ca. 60 mg/0.6 mL, measurement temperature: 120° C., window function: exponential (BF: 1.0 Hz), and chemical shift reference: benzene-$d_6$ (128.0 ppm).

<Melting Point (Tm)>

A 4-methyl-1-pentene copolymer produced in a Polymerization Example was preheated for 5 min using a hydraulic hot-press molding machine set at 190° C., then pressurized for 2 min, and cooled in a cooling tank set at 20° C. for 4 min within 1 min after the pressurization to make a pressed sheet having a thickness of 1 mm. This pressed sheet was stored at 23° C. for 3 days to provide a specimen.

The melting point (Tm) of the 4-methyl-1-pentene copolymer was measured as follows, using a differential scanning calorimeter "X-DSC7000" manufactured by SII calibrated with an indium standard.

The measurement sample (4-methyl-1-pentene copolymer) was weighed on an aluminum DSC pan so as to be about 10 mg. A lid was crimped onto the pan to place the sample under a sealed atmosphere to obtain a sample pan. The sample pan was placed in a DSC cell, and an empty aluminum pan was placed as a reference. The DSC cell was heated from −20° C. to 150° C. at 10° C./min under a nitrogen atmosphere (first heating process).

The melting peak top temperature of the enthalpy curve obtained in the first heating process was taken as the melting point (Tm). When two or more melting peaks were present, the maximum peak temperature was defined as Tm. No melting point being observed means that the sample is amorphous.

<Intrinsic viscosity [η] (dl/g)>

The intrinsic viscosity [η] of a copolymer was measured at 135° C. using a decalin solvent. Specifically, about 20 mg of a powder, pellets, or a resin lump of a copolymer was dissolved in 15 ml of decalin, and the specific viscosity ηsp was measured in an oil bath at 135° C. 5 ml of a decalin solvent was added to this decalin solution for dilution, and then the specific viscosity ηsp was measured in the same manner. This dilution operation was further repeated two times, and the value of ηsp/C when the concentration (C) was extrapolated to 0 was obtained as the intrinsic viscosity (see the formula below).

$$[\eta]=\lim(\eta sp/C)(C \to 0)$$

[Physical Properties of Lubricating Oil Compositions]

Various physical properties of the lubricating oil compositions obtained in the Examples and the Comparative Example were measured as follows.

<Kinematic Viscosity (KV)>

The kinematic viscosity at 100° C. and 40° C. of the lubricating oil composition prepared in the Examples or the Comparative Example was measured based on ASTMD445.

<Viscosity Index (VI)>

The viscosity index (VI) was calculated based on ASTM D2270 using the results of the kinematic viscosity (KV) at 40° C. and 100° C. of the lubricating oil composition measured based on ASTM D445.

<Shear Stability Index (SSI)>

The SSI of the mineral oil-blended lubricating oil composition prepared in the Examples or the Comparative Example was measured by an ultrasonic method with reference to the JPI-5S-29-88 provisions. The lubricating oil composition was irradiated with ultrasonic waves, and the SSI was measured from the kinematic viscosity decrease rate before and after the irradiation. The SSI is a measure of a decrease in kinematic viscosity due to the fact that the copolymer component in the lubricating oil is subjected to shear force under sliding and the molecular chain is cut. As the value of SSI becomes larger, a larger decrease in kinematic viscosity is indicated.

(Measuring Apparatus)

US-300TCVP type ultrasonic shear stability test apparatus (manufactured by Primtech)

(Measurement Conditions)

Oscillation frequency: 10 KHz

Test temperature: 40° C.

Irradiation horn position: 2 mm below the liquid level (Measurement Method)

30 ml of a sample was taken in a sample container and irradiated with ultrasonic waves with an output voltage of 4.2 V for 30 min. The kinematic viscosity of the sample oil at 100° C. before and after the ultrasonic irradiation was measured, and the SSI was obtained by the formula shown below:

$$SSI (\%)=100\times(Vo-Vs)/(Vo-Vb)$$

Vo: kinematic viscosity (mm$^2$/s) at 100° C. before ultrasonic irradiation

Vs: kinematic viscosity (mm$^2$/s) at 100° C. after ultrasonic irradiation

Vb: the kinematic viscosity (mm$^2$/s) at 100° C. of an engine oil (lubricating oil composition) with the amount of the component of a viscosity adjusting agent for lubricating oils adjusted at 0% by mass <Cold Cranking Simulator (CCS) Viscosity>

The CCS viscosity (−35° C.) of the mineral oil-blended lubricating oil composition prepared in the Examples or the Comparative Example was measured based on ASTM D2602. The CCS viscosity is used for the evaluation of the slidability (startability) of a crankshaft at low temperature. As the value becomes smaller, better low-temperature viscosity (low-temperature characteristics) of the lubricating oil is indicated.

When blending is performed for lubricating oil compositions so that the kinematic viscosity at 100° C. is at the same level, and the lubricating oil compositions are compared, the lubricating oil composition becomes better in fuel saving properties at low temperature (low-temperature startability) as the CCS viscosity of the lubricating oil composition becomes lower.

The Examples and the Comparative Example will be described below. In order to ensure an amount necessary for analysis as well as evaluation for lubricating oil adjusting agent, polymerization may be carried out a plurality of times.

For a catalyst (A) and a catalyst (B) used in Polymerization Examples, the following compounds were used.

Catalyst (A): A metallocene compound synthesized according to a synthesis example in International Publication No. WO 2006/025540, diphenylmethylene(3-tert-butyl-5-ethylcyclopentadienyl) (2,7-di-tert-butylfluorenyl)zirconium dichloride, was used as the "catalyst (A)".

Catalyst (B): A metallocene compound synthesized according to a synthesis example in International Publication No. WO 2015/122414, [bis(4-methoxyphenyl)methylene($\eta^5$-cyclopentadienyl) ($\eta^5$-tetramethyloctahydrodibenzofluorenyl)]hafnium dichloride, was used as the "catalyst (B)".

Polymerization Example 1
4-Methyl-1-pentene-Ethylene Copolymer

A magnetic stirring bar was placed in a sufficiently dried and nitrogen-purged Schlenk tube, and 9.26 μmol of the catalyst (A) as a metallocene compound was placed. A suspension of modified methylaluminoxane in an amount of 300 equivalents (n-hexane solvent, 2.76 mmol in terms of aluminum atoms) based on the catalyst (A) was added at room temperature with stirring, and then heptane was added in such an amount that the concentration of the catalyst (A) was 1.0 μmol/mL, to prepare a catalyst liquid.

750 mL of 4-methyl-1-pentene and 1.5 mL of a hexane solution of triisobutylaluminum (Al=0.50 M, 0.75 mmol) were charged into a sufficiently dried and nitrogen-purged SUS autoclave having an internal volume of 1,500 ml, and then heated to a polymerization temperature of 60° C. while being stirred at 850 revolutions/min. 17.8 NmL of hydrogen was added at the temperature, and then nitrogen was added until the autoclave internal pressure reached 0.34 MPaG. Further, pressurization was performed with ethylene until the total pressure reached 0.60 MPaG, to set the ethylene partial pressure at 0.26 MPa.

1.0 mL (amount of catalyst: 1.0 μmol) of the catalyst liquid prepared above and 3.0 mL of heptane were charged together into this autoclave to initiate polymerization, and ethylene was supplied until the stopping of the polymerization so as to maintain a total pressure of 0.6 MPaG. Methanol was added 10 min after the initiation of the polymerization to stop the polymerization.

The polymerization liquid taken out of the cooled/depressurized autoclave was introduced into a methanol/acetone (=3/1 [volume ratio]) mixed liquid to precipitate the polymer, and the polymer was filtered and collected. Subsequently, the collected polymer was dried under reduced pressure at 80° C. for 12 h to obtain 94.4 g of a polymer for evaluation.

Polymerization Examples 2 to 11

Operations were performed in the same manner as Polymerization Example 1 except that the polymerization conditions were changed as described in Table 2-1 and Table 2-2, to obtain polymers for evaluation.

Polymerization Example 12
4-Methyl-1-pentene-Propylene Copolymer

A magnetic stirring bar was placed in a sufficiently dried and nitrogen-purged Schlenk tube, and 10.36 μmol of the catalyst (A) as a metallocene compound was placed. A suspension of modified methylaluminoxane in an amount of 300 equivalents (n-hexane solvent, 3.11 mmol in terms of aluminum atoms) based on the catalyst (A) was added at room temperature with stirring, and then heptane was added in such an amount that the concentration of the catalyst (A) was 1.0 μmol/mL, to prepare a catalyst liquid.

750 mL of 4-methyl-1-pentene and 1.36 mL of a hexane solution of triisobutylaluminum (Al=0.55 M, 0.75 mmol) were charged into a sufficiently dried and nitrogen-purged SUS autoclave having an internal volume of 1,500 ml, and then heated to a polymerization temperature of 60° C. while being stirred at 850 revolutions/min. 8.9 NmL of hydrogen was added at the temperature, and then nitrogen was added until the autoclave internal pressure reached 0.40 MPaG. Further, pressurization was performed with propylene until the total pressure reached 0.60 MPaG, to set the propylene partial pressure at 0.20 MPa.

1.0 mL (amount of catalyst: 1.0 μmol) of the catalyst liquid prepared above and 3.0 mL of heptane were charged together into this autoclave to initiate polymerization, and propylene was supplied until the stopping of the polymerization so as to maintain a total pressure of 0.6 MPaG. Methanol was added 10 min after the initiation of the polymerization to stop the polymerization.

The polymerization liquid taken out of the cooled/depressurized autoclave was introduced into a methanol/acetone (=3/1 [volume ratio]) mixed liquid to precipitate the polymer, and the polymer was filtered and collected. Subsequently, the collected polymer was dried under reduced pressure at 80° C. for 12 h to obtain 45.5 g of a polymer for evaluation.

Polymerization Examples 13 to 15

Operations were performed in the same manner as Polymerization Example 12 except that the polymerization conditions were changed as described in Table 2-2, to obtain polymers for evaluation.

Polymerization Example 16

Operations were performed in the same manner as Polymerization Example 12 except that the solvent charged into the SUS autoclave was changed from 750 mL of 4-methyl-1-pentene to a mixed solvent of 400 mL of 4-methyl-1-pentene and 200 mL of heptane, to obtain 56.5 g of a polymer for evaluation.

Polymerization Examples 17 to 19

Operations were performed in the same manner as Polymerization Example 16 except that the polymerization conditions were changed as described in Table 2-2, to obtain polymers for evaluation.

The physical properties of the polymers obtained in the Polymerization Examples are shown in Table 2-1 and Table 2-2.

TABLE 2-1

| | Polymerization Example | | Polymerization Example 1 | Polymerization Example 2 | Polymerization Example 3 | Polymerization Example 4 | Polymerization Example 5 |
|---|---|---|---|---|---|---|---|
| Polymerization conditions | Polymerization temperature | [° C.] | 60 | 60 | 60 | 60 | 60 |
| | Polymerization time | [min] | 10 | 10 | 10 | 10 | 10 |
| | Hydrogen | [NmL] | 17.8 | 53.3 | 53.3 | 53.3 | 88.8 |
| | Ethylene | [MPa] | 0.26 | 0.35 | 0.30 | 0.25 | 0.32 |
| | Propylene | [MPa] | — | — | — | — | — |
| | 4MP-1 | [mL] | 750 | 750 | 750 | 750 | 750 |
| | Heptane | [mL] | — | — | — | — | — |
| | Catalyst (A) | [μmoL] | 1.00 | 1.00 | 1.00 | 1.00 | 1.00 |
| Copolymer | C2 content | [mol %] | 14 | 16 | 14 | 12 | 15 |
| | C3 content | [mol %] | — | — | — | — | — |
| | 4MP-1 content | [mol %] | 86 | 84 | 86 | 88 | 85 |
| | Melting point (Tm) | [° C.] | 120 | 112 | 124 | 138 | 121 |
| | Intrinsic viscosity [η] | [dl/g] | 1.72 | 1.23 | 1.18 | 1.15 | 1.02 |
| | Polymer yield | [g] | 94.4 | 114.1 | 83.1 | 70.9 | 153.3 |

| | Polymerization Example | | Polymerization Example 6 | Polymerization Example 7 | Polymerization Example 8 | Polymerization Example 9 | Polymerization Example 10 |
|---|---|---|---|---|---|---|---|
| Polymerization conditions | Polymerization temperature | [° C.] | 60 | 60 | 70 | 60 | 60 |
| | Polymerization time | [min] | 10 | 10 | 10 | 15 | 10 |
| | Hydrogen | [NmL] | 88.8 | 88.8 | 71.0 | 213.0 | 213.0 |
| | Ethylene | [MPa] | 0.28 | 0.25 | 0.20 | 0.29 | 0.27 |
| | Propylene | [MPa] | — | — | — | — | — |
| | 4MP-1 | [mL] | 750 | 750 | 750 | 750 | 750 |
| | Heptane | [mL] | — | — | — | — | — |
| | Catalyst (A) | [μmoL] | 1.00 | 1.00 | 1.00 | 0.60 | 0.60 |
| Copolymer | C2 content | [mol %] | 13 | 12 | 11 | 15 | 14 |
| | C3 content | [mol %] | — | — | — | — | — |
| | 4MP-1 content | [mol %] | 87 | 88 | 89 | 85 | 86 |
| | Melting point (Tm) | [° C.] | 138 | 142 | 158 | 121 | 131 |
| | Intrinsic viscosity [η] | [dl/g] | 0.95 | 0.97 | 0.95 | 0.64 | 0.65 |
| | Polymer yield | [g] | 142.4 | 114.3 | 101.8 | 47.2 | 68.0 |

TABLE 2-2

| Polymerization Example | | | Polymerization Example 11 | Polymerization Example 12 | Polymerization Example 13 | Polymerization Example 14 | Polymerization Example 15 |
|---|---|---|---|---|---|---|---|
| Polymerization conditions | Polymerization temperature | [° C.] | 60 | 60 | 60 | 60 | 60 |
| | Polymerization time | [min] | 10 | 10 | 10 | 10 | 10 |
| | Hydrogen | [NmL] | 213.0 | 8.9 | 53.3 | 35.5 | 71.0 |
| | Ethylene | [MPa] | 0.25 | — | — | — | — |
| | Propylene | [MPa] | — | 0.20 | 0.30 | 0.20 | 0.20 |
| | 4MP-1 | [mL] | 750 | 750 | 750 | 750 | 750 |
| | Heptane | [mL] | — | — | — | — | — |
| | Catalyst (A) | [μmoL] | 0.60 | 1.00 | 1.00 | 1.00 | 1.00 |
| Copolymer | C2 content | [mol %] | 13 | — | — | — | — |
| | C3 content | [mol %] | — | 19 | 19 | 18 | 18 |
| | 4MP-1 content | [mol %] | 87 | 81 | 81 | 82 | 82 |
| | Melting point (Tm) | [° C.] | 137 | 112 | 109 | 120 | 121 |
| | Intrinsic viscosity [η] | [dl/g] | 0.66 | 1.73 | 1.07 | 1.18 | 0.97 |
| | Polymer yield | [g] | 80.7 | 45.5 | 98.4 | 87.7 | 116.5 |

| Polymerization Example | | | Polymerization Example 16 | Polymerization Example 17 | Polymerization Example 18 | Polymerization Example 19 |
|---|---|---|---|---|---|---|
| Polymerization conditions | Polymerization temperature | [° C.] | 60 | 60 | 60 | 60 |
| | Polymerization time | [min] | 10 | 10 | 10 | 10 |
| | Hydrogen | [NmL] | 106.5 | 106.5 | 106.5 | 106.5 |
| | Ethylene | [MPa] | — | — | — | — |
| | Propylene | [MPa] | 0.14 | 0.13 | 0.125 | 0.10 |
| | 4MP-1 | [mL] | 400 | 400 | 400 | 400 |
| | Heptane | [mL] | 200 | 200 | 200 | 200 |
| | Catalyst (A) | [μmoL] | 1.00 | 0.60 | 1.00 | 1.00 |
| Copolymer | C2 content | [mol %] | — | — | — | — |
| | C3 content | [mol %] | 18 | 18 | 17 | 15 |
| | 4MP-1 content | [mol %] | 82 | 82 | 83 | 85 |
| | Melting point (Tm) | [° C.] | 118 | 122 | 126 | 154 |
| | Intrinsic viscosity [η] | [dl/g] | 0.69 | 0.68 | 0.69 | 0.69 |
| | Polymer yield | [g] | 56.5 | 39.4 | 70.3 | 69.2 |

Polymerization Example 20

500 ml of xylene was placed in a sufficiently nitrogen-purged glass reactor having an internal volume of 1.0 L and then heated to 90° C., and ethylene and propylene were continuously supplied at 99 l/h and 36.0 l/h respectively, while the interior of the polymerization vessel was stirred at 600 rpm, to saturate the liquid phase and the gas phase. Then, in a state in which ethylene and propylene were continuously supplied, 6.0 mL (6.0 mmol) of a toluene solution of triisobutylaluminum (also described as iBu$_3$Al) (1.0 mol/L), 3.0 mL (0.030 mmol) of a toluene solution of the catalyst (B) (0.010 mol/L), and then 12.0 mL (0.120 mmol) of a toluene solution of triphenylcarbenium tetrakis (pentafluorophenyl) borate (also described as Ph$_3$CB(C$_6$F$_5$)$_4$) (0.010 mol/L) were added to perform polymerization under normal pressure at 90° C. for 40 min. The polymerization was stopped by adding a small amount of isobutanol. The obtained polymerization reaction liquid was washed with dilute hydrochloric acid and separated to obtain an organic layer, and the organic layer was introduced into a large amount of methanol to precipitate an ethylene-propylene copolymer. The ethylene-propylene copolymer obtained by filtration was dried under reduced pressure at 130° C. for 10 h. The analysis results of the ethylene-propylene copolymer are shown in Table 3.

TABLE 3

| Polymerization Example | | Polymerization Example 20 |
|---|---|---|
| C2 content | [mol %] | 55 |
| C3 content | [mol %] | 45 |

TABLE 3-continued

| Polymerization Example | | Polymerization Example 20 |
|---|---|---|
| Melting point (Tm) | [° C.] | — |
| Intrinsic viscosity [η] | [dl/g] | 1.20 |

Examples 1 to 16, Comparative Example, and Reference Examples 1 to 3

Examples and Comparative Example

Lubricating oil compositions were prepared using the ethylene-α-olefin copolymers obtained in the Polymerization Examples, as viscosity adjusting agents for lubricating oils. The amount of the ethylene-α-olefin copolymer blended was adjusted so that the kinematic viscosity of the lubricating oil composition at 100° C. was about 8.0 mm$^2$/s.

The blending composition was as follows:
API group (III) base oil ("Yubase-4", manufactured by SK Lubricants Co., Ltd., kinematic viscosity at 100° C.: 4.21 mm$^2$/s, viscosity index: 123)
Additives*: 8.64% by mass
Pour-point depressant: 0.3% by mass
(polymethacrylate "LUBRAN 165", manufactured by TOHO CHEMICAL INDUSTRY Co., Ltd.)
Copolymer: as shown in Table 4-1 and Table 4-2
Total 100.0 (% by mass)
Note (*) additives=a conventional additive package for GF-5 engine oils including Ca and Na perbasic detergents, a N-containing dispersing agent, aminic and phenolic antioxidants, zinc dialkyldithiophosphates, a friction adjusting agent, and an antifoaming agent.

The evaluation results are shown in Table 4-1 and Table 4-2.

TABLE 4-1

|  |  |  | Example 1 | Example 2 | Example 3 | Example 4 | Example 5 |
|---|---|---|---|---|---|---|---|
| Polymerization Example of copolymer |  |  | Polymerization Example 1 | Polymerization Example 2 | Polymerization Example 3 | Polymerization Example 4 | Polymerization Example 5 |
| Copolymer | Ethylene content | [mol %] | 14 | 16 | 14 | 12 | 15 |
|  | Propylene content | [mol %] | — | — | — | — | — |
|  | 4MP-1 content | [mol %] | 86 | 84 | 86 | 88 | 85 |
|  | Melting point (Tm) | [° C.] | 120 | 112 | 124 | 138 | 121 |
|  | Intrinsic viscosity [η] | [dl/g] | 1.72 | 1.23 | 1.18 | 1.15 | 1.02 |
| Lubricating oil composition | Amount of copolymer blended | [%] | 0.64 | 0.81 | 0.86 | 0.86 | 0.98 |
|  | Kinematic viscosity @100° C. | [mm2/s] | 8.03 | 8.02 | 8.06 | 7.97 | 7.98 |
|  | Kinematic viscosity@40° C. | [mm2/s] | 37.6 | 39.8 | 39.4 | 38.9 | 36.9 |
|  | Viscosity index (VI) | [—] | 194 | 180 | 184 | 183 | 197 |
|  | Shear stability index (SSI) | [%] | 68 | 56 | 53 | 54 | 46 |
|  | CCS@−35° C. | [mPa · s] | 5260 | 5230 | 5200 | 5140 | 4930 |

|  |  |  | Example 6 | Example 7 | Reference Example 1 | Example 8 | Example 9 |
|---|---|---|---|---|---|---|---|
| Polymerization Example of copolymer |  |  | Polymerization Example 6 | Polymerization Example 7 | Polymerization Example 8 | Polymerization Example 9 | Polymerization Example 10 |
| Copolymer | Ethylene content | [mol %] | 13 | 12 | 11 | 15 | 14 |
|  | Propylene content | [mol %] | — | — | — | — | — |
|  | 4MP-1 content | [mol %] | 87 | 88 | 89 | 85 | 86 |
|  | Melting point (Tm) | [° C.] | 138 | 142 | 158 | 121 | 131 |
|  | Intrinsic viscosity [η] | [dl/g] | 0.95 | 0.97 | 0.95 | 0.64 | 0.65 |
| Lubricating oil composition | Amount of copolymer blended | [%] | 1.00 | 1.01 | 0.91 | 1.42 | 1.37 |
|  | Kinematic viscosity @100° C. | [mm2/s] | 7.99 | 7.944 | 8.11 | 7.99 | 7.94 |
|  | Kinematic viscosity@40° C. | [mm2/s] | 34.5 | 37.5 | 43.2 | 38.1 | 36.7 |
|  | Viscosity index (VI) | [—] | 216 | 199 | 164 | 189 | 196 |
|  | Shear stability index (SSI) | [%] | 45 | 44 | 54 | 27 | 27 |
|  | CCS@−35° C. | [mPa · s] | 4940 | 4790 | 5110 | 5370 | 5330 |

TABLE 4-2

|  |  |  | Example 10 | Example 11 | Reference Example 2 | Example 12 | Example 13 |
|---|---|---|---|---|---|---|---|
| Polymerization Example of copolymer |  |  | Polymerization Example 11 | Polymerization Example 12 | Polymerization Example 13 | Polymerization Example 14 | Polymerization Example 15 |
| Copolymer | Ethylene content | [mol %] | 13 | — | — | — | — |
|  | Propylene content | [mol %] | — | 19 | 19 | 18 | 18 |
|  | 4MP-1 content | [mol %] | 87 | 81 | 81 | 82 | 82 |
|  | Melting point (Tm) | [° C.] | 137 | 112 | 109 | 120 | 121 |
|  | Intrinsic viscosity [η] | [dl/g] | 0.66 | 1.73 | 1.07 | 1.18 | 0.97 |

TABLE 4-2-continued

| | | | | | | | |
|---|---|---|---|---|---|---|---|
| Lubricating oil composition | Amount of copolymer blended | [%] | 1.44 | 0.58 | 0.82 | 0.76 | 0.92 |
| | Kinematic viscosity@100° C. | [mm2/s] | 7.92 | 7.98 | 7.85 | 7.85 | 7.85 |
| | Kinematic viscosity@40° C. | [mm2/s] | 37.3 | 39.4 | 40.1 | 34.5 | 34.3 |
| | Viscosity index (VI) | [—] | 192 | 180 | 171 | 209 | 211 |
| | Shear stability index (SSI) | [%] | 26 | 67 | 51 | 56 | 45 |
| | CCS@−35° C. | [mPa · s] | 5210 | 5050 | 5880 | 5090 | 5520 |

| | | | Example 14 | Example 15 | Example 16 | Reference Example 3 | Comparative Example |
|---|---|---|---|---|---|---|---|
| Polymerization Example of copolymer | | | Polymerization Example 16 | Polymerization Example 17 | Polymerization Example 18 | Polymerization Example 19 | Polymerization Example 20 |
| Copolymer | Ethylene content | [mol %] | — | — | — | — | 55 |
| | Propylene content | [mol %] | 18 | 18 | 17 | 15 | 45 |
| | 4MP-1 content | [mol %] | 82 | 82 | 83 | 85 | — |
| | Melting point (Tm) | [° C.] | 118 | 122 | 126 | 154 | — |
| | Intrinsic viscosity [η] | [dl/g] | 0.69 | 0.68 | 0.69 | 0.69 | 1.20 |
| Lubricating oil composition | Amount of copolymer blended | [%] | 1.28 | 1.29 | 1.29 | 1.33 | 0.70 |
| | Kinematic viscosity@100° C. | [mm2/s] | 7.96 | 7.98 | 7.97 | 7.94 | 7.96 |
| | Kinematic viscosity@40° C. | [mm2/s] | 37.4 | 36.4 | 39.3 | 42.2 | 41.8 |
| | Viscosity index (VI) | [—] | 193 | 201 | 181 | 163 | 165 |
| | Shear stability index (SSI) | [%] | 31 | 31 | 31 | 27 | 25 |
| | CCS@−35° C. | [mPa · s] | 5070 | 5170 | 5190 | 4960 | 6091 |

Comparison Between Examples and Comparative Example

The Examples have a high viscosity index with respect to the Comparative Example and the Reference Examples. In addition, it is seen that the Examples also have low CCS viscosity with respect to the Comparative Example.

The invention claimed is:

1. A lubricating oil composition comprising a resin (A) and a base oil (B), wherein the resin (A) satisfies the following requirements (A-1) to (A-3), the base oil (B) satisfies the following requirement (B-1), and a content ratio between the resin (A) and the base oil (B) is such that the resin (A) is in a range of 0.01 to 50 parts by mass per 100 parts by mass in total of the resin (A) and the base oil (B):
   (A-1) the resin (A) is a polymer comprising a constituent unit derived from 4-methyl-1-pentene in a range of 60 to 99 mol % and a constituent unit derived from an α-olefin having 2 to 20 carbon atoms (excluding 4-methyl-1-pentene) in a range of 1 to 40 mol % (provided that 4-methyl-1-pentene and the α-olefin is 100 mol % in total);
   (A-2) intrinsic viscosity [η] measured in decalin at 135° C. is in a range of 0.01 to 5.0 dl/g;
   (A-3) a melting point (Tm) is in a range of 110 to 150° C. as determined by differential scanning calorimetry (DSC); and
   (B-1) kinematic viscosity at 100° C. is in a range of 1 to 50 m²/s.

2. The lubricating oil composition according to claim 1, wherein in the requirement (A-1), the polymer comprises ethylene and/or propylene as the α-olefin.

3. The lubricating oil composition according to claim 1, wherein in the requirement (A-1), the polymer comprises 1 to 18 mol % of ethylene as the α-olefin.

4. The lubricating oil composition according to claim 1, wherein in the requirement (A-1), the polymer comprises 1 to 22 mol % of propylene as the α-olefin.

5. The lubricating oil composition according to claim 1, wherein in the requirement (A-2), the intrinsic viscosity [η] measured in decalin at 135° C. is in a range of 0.3 to 2.5 dl/g.

6. The lubricating oil composition according to claim 1, wherein the content ratio between the resin (A) and the base oil (B) is such that the resin (A) is 0.01 to 5 parts by mass per 100 parts by mass in total of the resin (A) and the base oil (B).

7. The lubricating oil composition according to claim 1, wherein the base oil (B) is a mineral oil.

8. The lubricating oil composition according to claim 1, wherein the base oil (B) is a synthetic oil.

9. The lubricating oil composition according to claim 1, comprising a pour-point depressant (C) in an amount of 0.05 to 5% by mass based on 100% by mass of the lubricating oil composition.

* * * * *